(12) United States Patent
Zhang et al.

(10) Patent No.: US 10,761,340 B2
(45) Date of Patent: Sep. 1, 2020

(54) MULTIMODAL DISPLAY DEVICE AND DISPLAY METHOD THEREOF

(71) Applicant: BOE TECHNOLOGY GROUP CO., LTD., Beijing (CN)

(72) Inventors: Yuxin Zhang, Beijing (CN); Hongfei Cheng, Beijing (CN); Xinyin Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 84 days.

(21) Appl. No.: 15/578,897

(22) PCT Filed: Apr. 1, 2017

(86) PCT No.: PCT/CN2017/079338
§ 371 (c)(1),
(2) Date: Dec. 1, 2017

(87) PCT Pub. No.: WO2018/076611
PCT Pub. Date: May 3, 2018

(65) Prior Publication Data
US 2018/0299684 A1    Oct. 18, 2018

(30) Foreign Application Priority Data

Oct. 28, 2016   (CN) .......................... 2016 1 0966994

(51) Int. Cl.
*G02B 30/27*   (2020.01)
*G02F 1/29*    (2006.01)
*G02F 1/13357* (2006.01)

(52) U.S. Cl.
CPC .......... *G02B 30/27* (2020.01); *G02F 1/1336* (2013.01); *G02F 1/133603* (2013.01);
(Continued)

(58) Field of Classification Search
CPC combination set(s) only.
See application file for complete search history.

(56) References Cited

U.S. PATENT DOCUMENTS

2002/0159004 A1* 10/2002 Jung .................... G02B 5/3016
                                                 349/87
2009/0207389 A1*  8/2009 Roberts .............. G02B 27/2292
                                                 355/22
(Continued)

FOREIGN PATENT DOCUMENTS

CN    101101379 A    1/2008
CN    101266338 A    9/2008
(Continued)

OTHER PUBLICATIONS

English translation of International Search Report dated Apr. 1, 2017, issued in counterpart International Application No. PCT/CN2017/079338 (15 pages).
(Continued)

*Primary Examiner* — Lauren Nguyen
(74) *Attorney, Agent, or Firm* — Westerman, Hattori, Daniels & Adrian, LLP (57) ABSTRACT

This present invention relates to a display device. The display device may include a backlight module configured to emit coherent light and incoherent light selectively, a spatial light modulator configured to display one of at least two types of image information, and a liquid crystal lens. The spatial light modulator and the liquid crystal lens may be sequentially disposed on a light exit path of the backlight module.

14 Claims, 10 Drawing Sheets

(52) U.S. Cl.
CPC .......... *G02F 1/133606* (2013.01); *G02F 1/29* (2013.01); *G02F 2001/133607* (2013.01); *G02F 2001/133626* (2013.01); *G02F 2203/12* (2013.01)

(56) References Cited

U.S. PATENT DOCUMENTS

| | | | |
|---|---|---|---|
| 2009/0219385 A1* | 9/2009 | Leister | G02B 27/2214 348/51 |
| 2012/0162592 A1* | 6/2012 | Takagi | G02B 27/2214 349/139 |
| 2012/0242913 A1 | 9/2012 | Miyazawa et al. | |
| 2015/0185488 A1* | 7/2015 | Wu | G02F 1/13306 349/15 |
| 2016/0033710 A1 | 2/2016 | Kim et al. | |

FOREIGN PATENT DOCUMENTS

| | | |
|---|---|---|
| CN | 101347003 A | 1/2009 |
| CN | 102520604 A | 6/2012 |
| CN | 102692768 A | 9/2012 |
| CN | 102955256 A | 3/2013 |
| CN | 103309096 A | 9/2013 |
| CN | 105388678 A | 3/2016 |
| EP | 0721131 A2 | 7/1996 |
| WO | 2007109725 A2 | 9/2007 |

OTHER PUBLICATIONS

Office Action dated Jul. 4, 2019, issued in counterpart CN Application No. 201610966994.1, with English translation (19 pages).
Office Action dated Dec. 18, 2019, issued in counterpart CN application No. 201610966994.1, with English translation. (26 pages).

* cited by examiner

Fig. 10 ent light source into the incoherent light, thereby switching the light emitted by the backlight module between the coherent light and the incoherent light.

MULTIMODAL DISPLAY DEVICE AND DISPLAY METHOD THEREOF

CROSS-REFERENCE TO RELATED APPLICATIONS

This application claims the benefit of the filing date of Chinese Patent Application No. 201610966994.1 filed on Oct. 28, 2016, the disclosure of which is hereby incorporated by reference.

TECHNICAL FIELD

This invention relates to optical display technology, and more particularly, to an optical device and a display method thereof.

BACKGROUND

Among all technical categories of stereoscopic display, holographic display is considered to be the ultimate technology for displaying stereoscopic images. Holographic display devices currently on the market are mostly static holographic display devices. There has not been any dynamic holographic display device which is capable of mass production on the market. The main factors that limit development of the dynamic holographic display device include small viewing angles of holographic display, very few sources, and limited range of movement when viewing. Thus, a display device having only a single function cannot meet people's different needs for viewing.

BRIEF SUMMARY

Accordingly, one example of the present disclosure is a display device. The display device may comprise a backlight module configured to emit coherent light and incoherent light selectively, a spatial light modulator configured to display one of at least two types of image information, and a liquid crystal lens. The spatial light modulator and the liquid crystal lens may be sequentially disposed on a light exit path of the backlight module.

The display device may further comprise a control module. The control module may be configured to control light emitted by the backlight module to switch between the coherent light and the incoherent light, provide any one of at least two types of image information to the spatial light modulator and control deflection of liquid crystal molecules in the liquid crystal lens, and control the spatial light modulator to display an image based on the provided image information. The at least two types of image information may be selected from the group consisting of holographic image information, naked-eye three-dimensional image information, and two-dimensional image information.

In one embodiment, the backlight module may comprise a light emitting unit and a collimator lens. The collimating lens and the spatial light modulator may be sequentially disposed on a light exit path of the light emitting unit. The light emitting unit and the control module may be electrically connected.

In one embodiment, the light emitting unit may comprise a coherent light source and an incoherent light source. The control module may be configured to control the coherent light source and the incoherent light source to alternately emit light, thereby switching the light emitted by the backlight module between the coherent light and the incoherent light.

In one embodiment, the light emitting unit may comprise a coherent light source and a light converter. The light converter, the collimator lens, and the spatial light modulator may be sequentially disposed on a light exit path of the coherent light source. The coherent light source and the light converter may be respectively electrically connected to the control module. The control module may be configured to control the coherent light source to emit light and the light converter to convert the light emitted by the coherent light source into the incoherent light, thereby switching the light emitted by the backlight module between the coherent light and the incoherent light.

The light emitting unit may comprise a laser light source or a light-emitting diode light source. The spatial light modulator may be a liquid crystal display spatial light modulator having a flat plate structure.

The liquid crystal lens may comprise a first substrate, a fast electrode formed on the first substrate, a second electrode formed on a surface of the spatial light modulator facing the first substrate. The first substrate may be disposed opposite to the spatial light modulator. Liquid crystal molecules are formed between the first electrode and the second electrode. In one embodiment, the liquid crystal lens may further comprise a passivation layer formed between the surface of the spatial light modulator and the second electrode.

In one embodiment, the liquid crystal lens may comprise a first substrate, a first electrode formed on the first substrate, a second substrate formed on a surface of the spatial light modulator facing the first substrate, a second electrode formed on the second substrate, and liquid crystal molecules between the first electrode and the second electrode.

Both the first electrode and the second electrode may be strip electrodes. Alternatively, the first electrode may be a strip electrode and the second electrode may be a plate electrode.

The display device may further comprise a first polarizer on a side of the spatial light modulator facing the backlight module and a second polarizer on a side of the spatial light modulator opposite to the backlight module. A polarization direction of the second polarizer may be parallel to a long axis direction of the liquid crystal molecules in a first state. The liquid crystal molecules in the first state do not adjust the light emitted by the backlight module.

Another example of the present disclosure is a display method of a display device. The display method may comprise controlling light emitted by the backlight module to switch between the coherent light and the incoherent light, providing any one of at least two kinds of image information to the spatial light modulator and controlling deflection of liquid crystal molecules in the liquid crystal lens, and controlling the spatial light modulator to display an image based on the provided image information.

Controlling the light emitted by the backlight module to switch between the coherent light and the incoherent light may comprise controlling the backlight module to emit the coherent light in a holographic display mode and controlling the backlight module to emit the incoherent light when the holographic display mode of the display device is switched to a naked-eye three-dimensional display mode or a two-dimensional display mode.

Providing any one of at least two types of image information to the spatial light modulator and controlling the deflection of liquid crystal molecules in the liquid crystal lens may comprise providing holographic image information to the spatial light modulator and controlling the liquid crystal molecules in the liquid crystal lens to deflect to a first state in a holographic display mode, providing naked-eye three-dimensional image information to the spatial light modulator and controlling the liquid crystal molecules in the liquid crystal lens to deflect to form a liquid crystal lenticular lens in a naked-eye three-dimensional display mode, and providing two-dimensional image information to the spatial light modulator and controlling the liquid crystal molecules in the liquid crystal lens to deflect to the first state in a two-dimensional display mode. The liquid crystal molecules in the first state do not adjust the light emitted by the backlight module.

Controlling the spatial light modulator to display an image based on the provided image information may comprise controlling the spatial light modulator to display a holographic image based on the holographic image information in a holographic display mode, controlling the spatial light modulator to display a naked-eye three-dimensional image based on the naked-eye three-dimensional image information in a naked-eye three-dimensional display mode, and controlling the spatial light modulator to display a two-dimensional image based on the two-dimensional image information in a two-dimensional display mode.

Controlling the liquid crystal molecules in the liquid crystal lens to deflect to the first state may comprise applying a voltage to a first electrode and a second electrode of the liquid crystal lens respectively with a voltage difference between the first electrode and the second electrode being a first voltage difference. The liquid crystal molecules in the liquid crystal lens may be deflected to the first state by the first voltage difference.

Controlling the liquid crystal molecules in the liquid crystal lens to deflect to form a liquid crystal lenticular lens may comprise applying a voltage to a first electrode and a second electrode of the liquid crystal lens respectively with a voltage difference between the first electrode and the second electrode being a second voltage difference. The liquid crystal molecules in the liquid crystal lens may be deflected by the second voltage difference to form the liquid crystal lenticular lens.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

The present invention is described with reference to embodiments of the invention. Throughout the description of the invention, reference is made to FIGS. 1-10. When referring to the figures, like structures and elements shown throughout are indicated with like reference numerals. The following examples are intended to illustrate the present invention, but are not intended to limit the scope of the invention.

Figure 1:
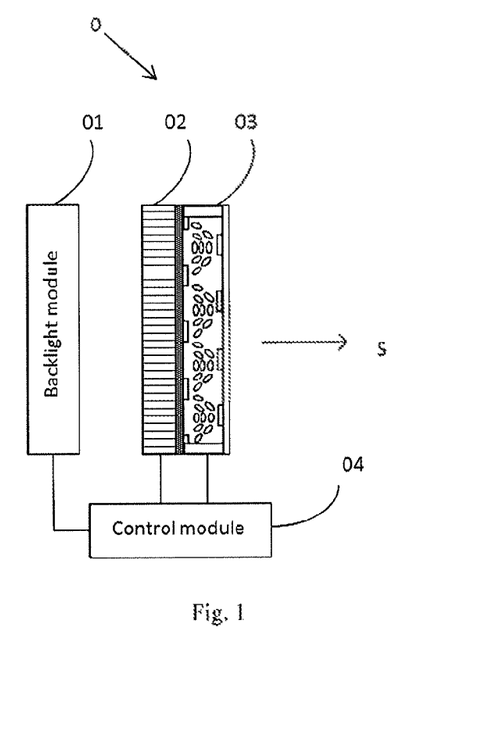
FIG. 1 is a schematic structural view of a display device according to one embodiment of the present invention.

FIG. 1 shows a schematic structural diagram of a display device according to one embodiment of the present invention. The display device 0 can switch between at least two display modes. As shown in FIG. 1, the display device 0 includes a backlight module 01, a light modulation module 02, a liquid crystal lens 03, and a control module 04. The light modulation module 02 and the liquid crystal lens 03 are sequentially disposed on a light exit path S of the backlight module 01. Furthermore, the liquid crystal lens 03 is disposed on the light modulation module 02. The control module 04 is electrically connected to the backlight module 01, the light modulation module 02, and the liquid crystal lens 03, respectively.

The control module 04 is used for controlling light emitted by the backlight module 01 to switch between coherent light and incoherent light. The control module 04 is further used for providing any one of at least two types of image information to the light modulation module 02 and controlling deflection of liquid crystal molecules in the liquid crystal lens 03. The control module 04 is also further used for controlling the light modulation module 02 to display an image based on the provided image information under action of the light emitted by the backlight module 01 and the liquid crystal lens 03.

As described above, in the display device according to one embodiment of the present mention, the control module can control the light emitted by the backlight module to switch between coherent light and incoherent light and provide any one of at least two types of image information to the light modulation module. As a result, the light modulation module can display an image based on the provided image information. Accordingly, the display device can display at least two types of images and meet people's different needs for viewing. The display device can overcome shortcomings of a display device having only a single function, which cannot meet people's different needs for viewing.

In one embodiment, the at least two types of image information include at least two of the following image information: holographic image information naked-eye three-dimensional (3D) image information, and two-dimensional (2D) image information. The display modes of the display device include at least two of the following modes: a holographic display mode, a naked-eye 3D display mode, and a 2D display mode.

In the holographic display mode, the control module 04 is configured to control the backlight module 01 to emit coherent light, provide holographic image information to the light modulation module 02 and control liquid crystal molecules in the liquid crystal lens 03 to deflect to a first state, and control the light modulation module 02 to display a holographic image based on the provided holographic image information. The liquid crystal molecules in the first state have no adjustment effect on the light incident on the liquid crystal lens 03.

In the naked-eye 3D display mode, the control module 04 is configured to control the backlight module 01 to emit incoherent light, provide naked-eye 3D image information to the light modulation module 02 and control liquid crystal molecules in the liquid crystal lens 03 to deflect to form a liquid crystal lenticular lens, and control the light modulation module 02 to display a naked-eye 3D image based on the provided naked-eye 3D image information.

In the 2D display mode, the control module 04 is configured to control the backlight module 01 to emit incoherent light, provide 2D image information to the light modulation module 02 and control liquid crystal molecules in the liquid crystal lens 03 to deflect to the first state, and control the light modulation module 02 to display the 2D image based on the provided 2D image information.

Figure 2:
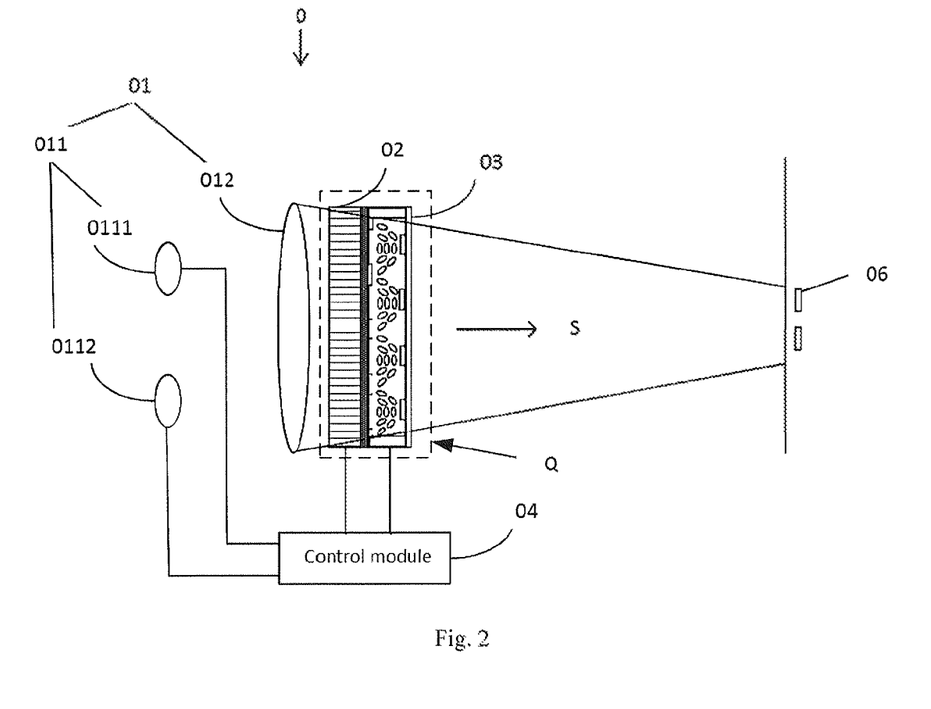
FIG. 2 is a schematic display diagram of a display device according to one embodiment of the present invention.

FIG. 2 shows a schematic display view of a display device according to one embodiment of the present invention. As shown in FIG. 2, the backlight module 01 includes a light emitting unit 011 and a collimator lens 012. A light exit path S of the backlight module 01 is also a light exit path of the light emitting unit 011. The collimator lens 012 and the light modulating module 02 are sequentially disposed on the light exit path S of the light emitting unit 011. The light emitting unit 011 is electrically connected to the control module 04.

In one embodiment, as shown in FIG. 2, the light emitting unit 011 includes a coherent light source 0111 and an incoherent light source 0112. The light exit path of the light emitting unit 011 is also the light exit path of the coherent light source 0111 as well as that of the incoherent light source 0112. A collimator lens 012 and a light modulation module 02 are sequentially disposed on the light exit path S of the coherent light source 0111 and that of the incoherent light source 0112. The coherent light source 0111 and the incoherent light source 0112 are electrically connected to the control module 04, respectively. The control module 04 is configured to control the coherent light source 0111 and the incoherent light source 0112 to alternately emit light, thereby switching the light emitted by the backlight module 01 between coherent light and incoherent light. The light emitted by the backlight module then reaches a user's eyes 06.

Figure 3:
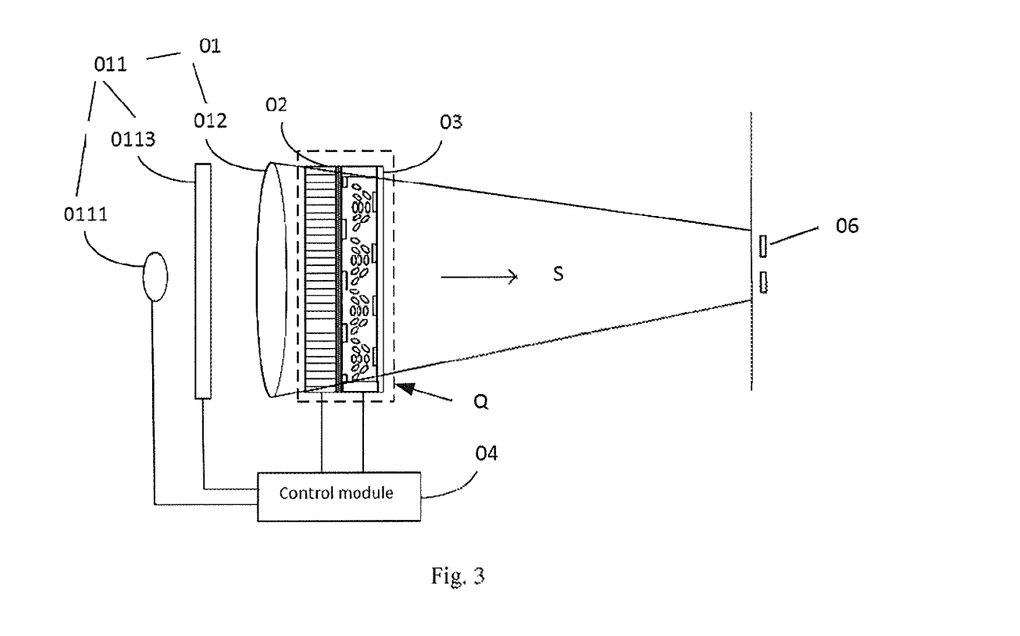
FIG. 3 is a schematic display diagram of a display device according to one embodiment of the present invention.

FIG. 3 shows another schematic display vies of a display device according to one embodiment of the present invention. As shown, in FIG. 3, the light emitting unit 011 includes a coherent light source 0111 and a light converter 0113. A light exit path S of the light emitting unit 011 is also a light exit path of the coherent light source 0111. The light converter 0113, the collimator lens 012, and the light modulation module 02 are sequentially disposed on the light exit path S of the coherent light source 0111. The coherent light source 0111 and the light converter 0113 are electrically connected to the control module 04, respectively. The control module 04 is configured to control the coherent light source 0111 to emit light, or control the coherent light source 0111 to emit light and the light converter 0113 to convert the coherent light emitted by the coherent light source 0111 into incoherent light, thereby switching the light emitted by the backlight module 01 between coherent light and incoherent light.

In one embodiment, the light emitting unit may be a laser light source or a light-emitting diode (LED).

Figure 4:
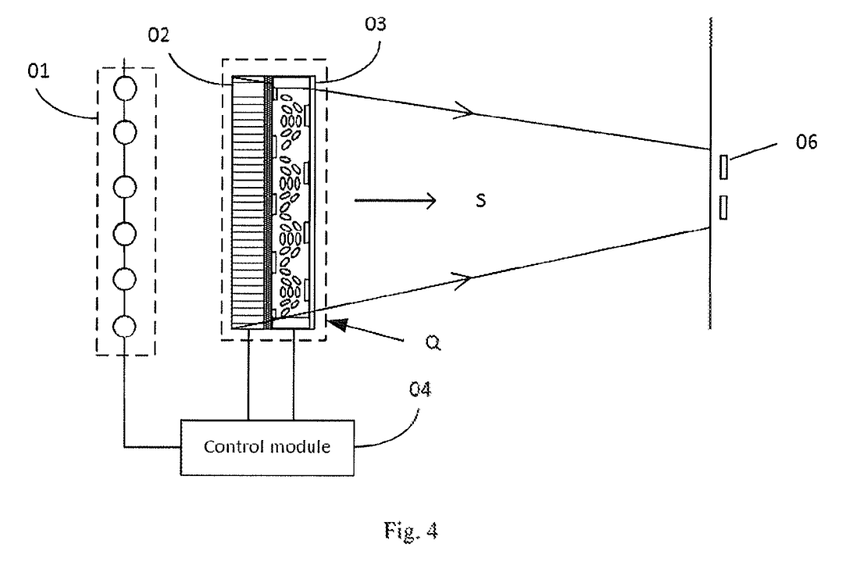
FIG. 4 is a schematic display diagram of a display device according to one embodiment of the present invention.
Figure 5:
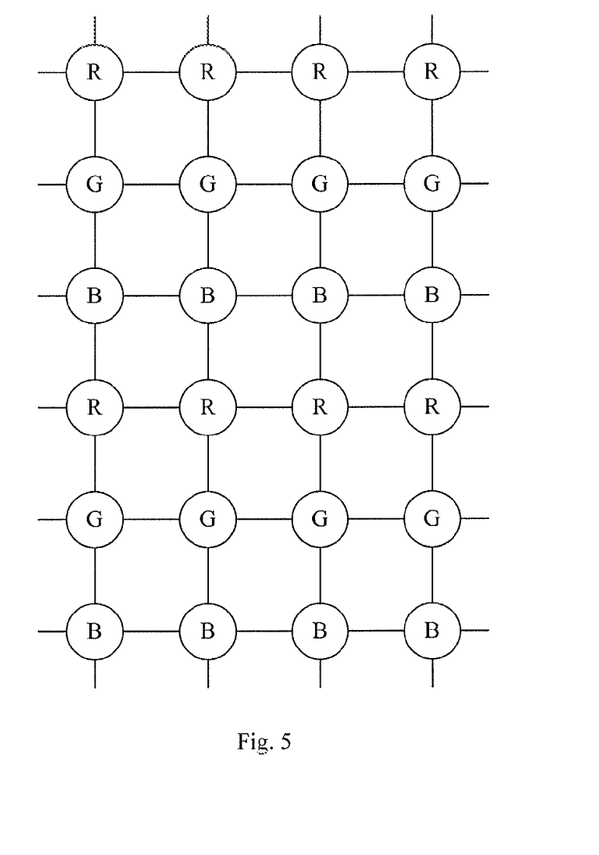
FIG. 5 is a schematic diagram of an LED array according to one embodiment of the present invention.
Figure 6:
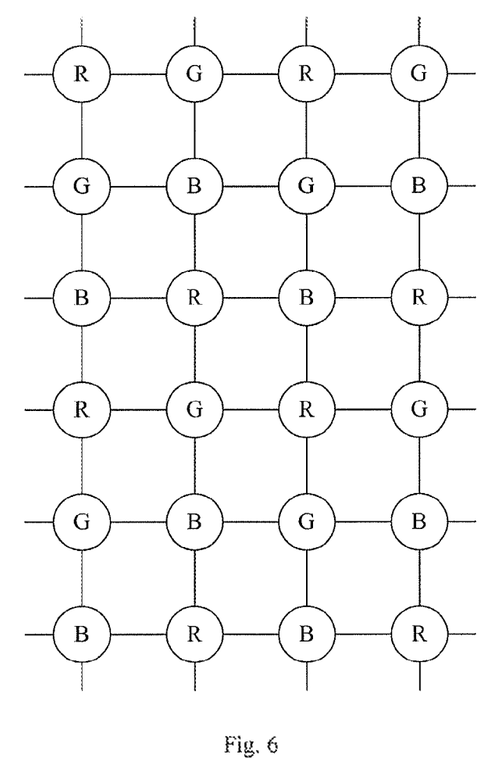
FIG. 6 is a schematic diagram of an LED array according to one embodiment of the present invention.
Figure 7:
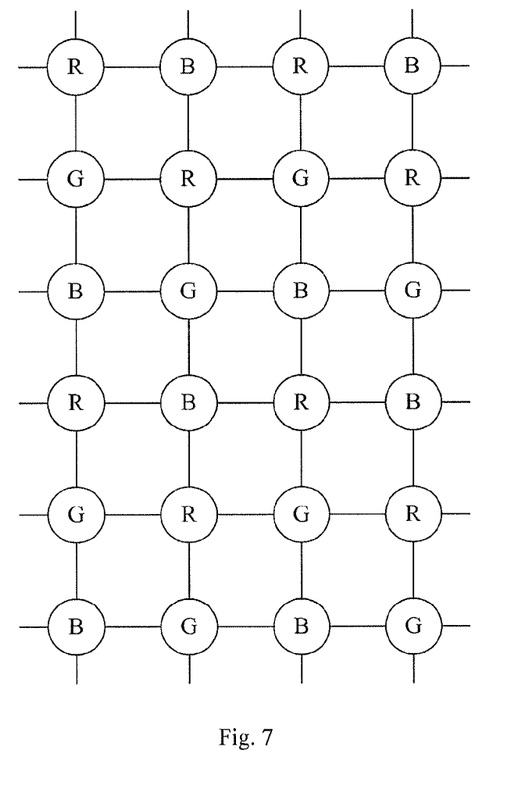
FIG. 7 is a schematic diagram of an LED array according to one embodiment of the present invention.

FIG. 4 shows another schematic display view of a display device according to one embodiment of the present invention. As shown in FIG. 4, the backlight module 01 is an array of light-emitting diodes (LEDs). For example, the LED array may be the LED array shown in any one of FIGS. 5 to 7. As shown in FIGS. 5 to 7, the array of LEDs may include three colors of LED lights, which are red (R), green (G), and Blue (B) colors. As such, the display device can realize colored display. The LED array may be arranged in a variety of other ways and the embodiment of the present invention is not limited thereto.

In one embodiment, the light modulation module 02 comprises a spatial light modulator (SLM) 022. The spatial light modulator (SLM) is a transmissive or reflective device that's used to spatially modulate amplitude and phase of an optical wavefront in two dimensions. The SLM may be an electrooptical liquid crystal SLM containing liquid crystals as modulation material. The optical properties of the liquid crystals may be modified by means or an electric field. In one embodiment, the spatial light modulator 022 may specifically be a Liquid Crystal Display Spatial Light Modulator (LCD-SLM). The spatial light modulator may have a flat plate-like structure.

Figure 8:
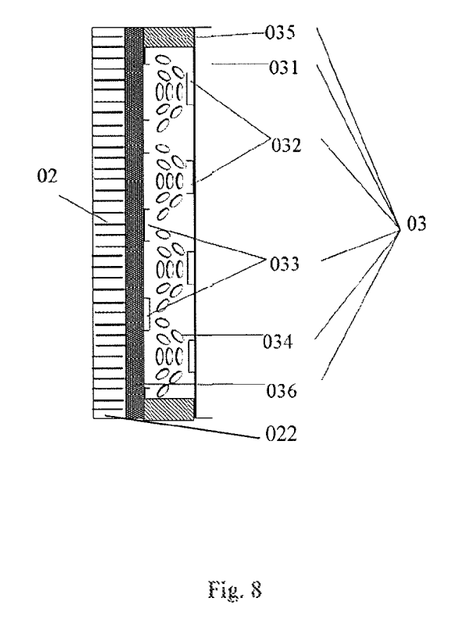
FIG. 8 is an enlarged view of a partial area of a display device according to one embodiment of the present invention.

FIG. 8 shows an enlarged view of the area Q in FIGS. 2 to 4. As shown in FIG. 8, the liquid crystal lens 03 includes a first substrate 031, a first electrode 032 formed on the first substrate 031, a second electrode 033 formed on a plate surface of the spatial light modulator 022 facing the first substrate. The first substrate 031 is disposed opposite to the spatial light modulator 022. The first electrode 032 is located between the first substrate 031 and the second electrode 033. A liquid crystal layer 034 is formed between the first electrode 032 and the second electrode 033.

In one embodiment, the liquid crystal lens 03 includes a second electrode 033 and a first substrate 031 opposite the second electrode 033. A first electrode 032 is formed on a surface of the first substrate 031 facing the second electrode 033. A liquid crystal layer 034 is formed between the first electrode 032 and the second electrode 033. A surface of the second electrode 033 opposite to the first electrode 031 is adhesively attached to a plane surface of the spatial light modulator 022. In one embodiment, an alignment layer may be disposed on a surface of the first electrode 032 facing the liquid crystal layer 034 and on a surface of the second electrode 033 facing the liquid crystal layer 034, respectively. These alignment layers may facilitate alignment of liquid crystal molecules in the liquid crystal layer 034. Both the first electrode 032 and the second electrode 033 may be strip electrodes. Alternatively, the first electrode 032 may be a strip electrode, and the second electrode 033 may be a plate electrode, and the present invention is not limited thereto.

Furthermore, a frame sealant 035 is provided between the first electrode 032 and the second electrode 033, and the liquid crystal layer 034 is located in a space surrounded by the frame sealant 035.

In one embodiment, as shown in FIG. 8, a passivation layer 036 is disposed between the second electrode 033 and a plate surface or the spatial light modulator 022 facing the first substrate. The second electrode 033 is formed on the passivation layer 036, which is formed on the surface of the spatial light modulator 022. In another embodiment, the passivation layer 036 may be adhesively attached to the plate surface of the spatial light modulator 022. The passivation layer 036 is transparent, and can be adhesively attached to the surface of the spatial light modulator 022 through an Optically Clear Adhesive (OCA). The embodiment of the present invention is not limited thereto. In another embodiment, a second substrate is provided between the second electrode 033 and the plate surface of the spatial light modulator 022 facing the first substrate, and the second electrode 033 is formed on the second substrate.

Further, as shown in FIG. 8, the frame sealant 035 may be disposed between the first substrate 031 and the passivation layer 036. Alternatively, the frame adhesive 035 may be disposed between the first substrate 031 and the second substrate or between the first substrate 031 and a plate surface of the spatial light modulator 022 facing the first substrate. The liquid crystal laser 034 is located in the space surrounded by the frame sealant 035.

In one embodiment, a first polarizer may be disposed on a side of the light modulation module 02 facing the backlight module 01. A second polarizer may be disposed on a side of the light modulation module 02 opposite to the backlight module 01. In order that the liquid crystals in the first state in the liquid crystal lens do not adjust the light (that is, the lenticular lens effect is not shown, and the normal light transmission state is realized), it is necessary to keep the polarization direction of the second polarizer on the light modulation module 02 parallel to the long axis direction of the liquid crystal molecules in the first state.

As described above, in the display devices according to embodiments of the present invention, the control module can control the light emitted by the backlight module to switch between coherent light and incoherent light, provide the light modulation module with any one of at least two types of image information, and control the light modulation module to display an image based on the provided image information. As such, the display devices according to the embodiments of the present invention can display at least two types of images and meet people's different needs for viewing. This overcomes shortcomings of a display device having only a single function, which cannot satisfy people's different needs for viewing. Further, according to embodiments of the present invention, the at least two types of image information may include at least two of the following image information: holographic image information, naked-eye 3D image information, and 2D image information. The display modes of the display device may include a holographic display mode, a naked-eye 3D display mode, and a 2D display mode. Therefore, the display devices according to embodiments of the present invention can realize a holographic display mode, a naked-eye 3D display mode, and a 2D display mode, and switch among the three display modes. As a result, the present invention can overcome shortcomings of the present single display device such as small viewing angle, very few sources, and a limited range of movement during viewing, and allow users to select among the holographic display mode, the naked-eye 3D display mode and the 2D display mode.

The display device according to one embodiment of the present invention realizes switching among holographic display, naked-eye 3D display, and 2D display by making the liquid crystal lens on the LCD-SLM, controlling alignment of the liquid crystal molecules of the liquid crystal lens, and switching between a coherent light source and an incoherent light source.

The display device provided by the embodiments of the present invention can be applied to the method described below. The manufacturing method, manufacturing principle and display method of the display device according to embodiments of the present invention are described in the following embodiments.

Figure 9:
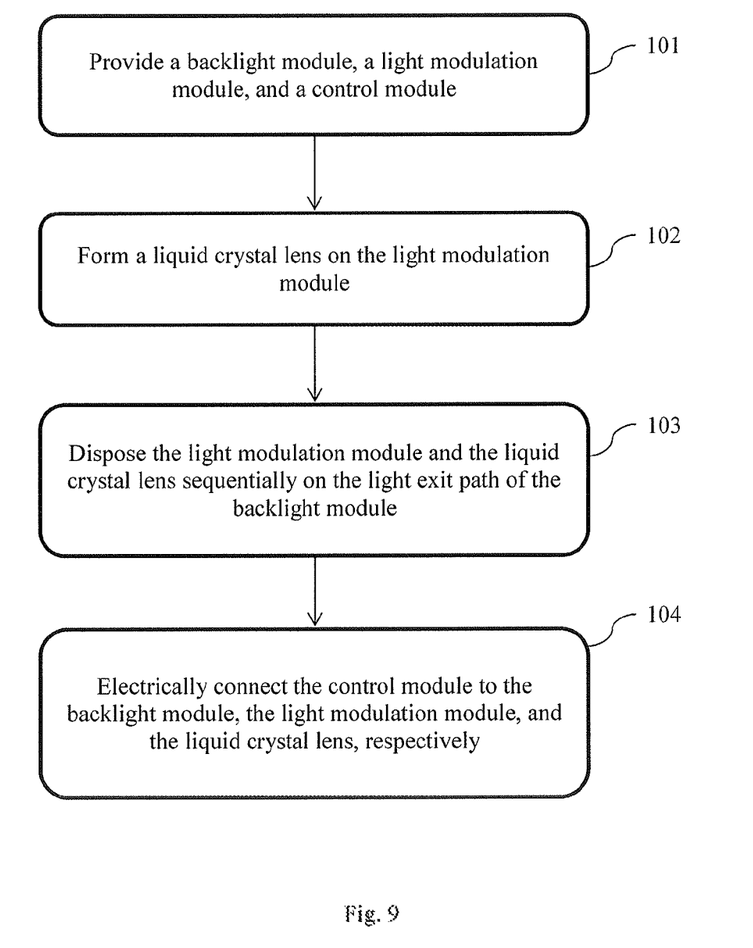
FIG. 9 is a flow chart of a method for manufacturing a display device according to one embodiment of the present invention.

FIG. 9 shows a flow chart of a method of manufacturing a display device according to one embodiment of the present invention. The manufacturing method can be used for manufacturing the display device shown in any one of FIGS. 1 to 4. As shown in FIG. 9, the manufacturing method of the display device may include the following steps.

In step 101, a backlight module, a light modulation module and a control module are provided.

In step 102, a liquid crystal lens is formed on the light modulating module.

In step 103, the light modulation module and the liquid crystal lens are sequentially disposed on the light exit path of the backlight module.

In step 104, the control module is electrically connected to the backlight module, the light modulation module, and the liquid crystal lens, respectively.

The control module is configured to control light emitted by the backlight module to switch between coherent light and incoherent light, provide any one of at least two types of image information to the light modulation module and control deflection of liquid crystal molecules in the liquid crystal lens, and control the light modulation module to display an image based on the image information provided by the control module under action of the light emitted by the backlight module and the liquid crystal lens.

As described above, in the manufacturing method of the display device according to one embodiment of the present invention, the control module can control the light emitted by the backlight module to switch between coherent light and incoherent light, provide at least two types of image information to the light modulation module, and control the light modulation module to display an image based on the provided image information. Accordingly, the display device according to one embodiment of the present invention can display at least two types of images, and overcome shortcomings of a display device having only a single function, which cannot meet people's different needs for viewing.

In one embodiment, the light exit path of the backlight module 01 may be the light exit path S as shown in any of FIGS. 2 to 4. As shown in FIGS. 2 to 4, the control module 04 may control the backlight module 01 to emit coherent light, provide holographic image information to the light modulation module 02, control liquid crystal molecules in the liquid crystal lens 03 to deflect to a first state, and control the light modulation module 02 to display holographic image based on the holographic image information. The liquid crystal molecules in the first state have no adjustment effect on the light incident on the liquid crystal lens 03. As such, the display device can realize holographic display and has a holographic display mode.

The control module 04 may also control the backlight module 01 to emit incoherent light, provide naked-eye 3D image information to the light modulation module 02 and control liquid crystal molecules in the liquid crystal lens 03 to deflect to form a liquid crystal lenticular lens, and control the light modulation module 02 to display naked-eye 3D image based on the naked-eye 3D image information. As such, the display device can realize naked-eye 3D display and has a naked-eye 3D display mode.

The control module 04 may also control the backlight module 01 to emit incoherent light, provide 2D image information to the light modulation module 02 and control the liquid crystal molecules in the liquid crystal lens 03 to deflect to the first state, and control the light modulation module 02 to display 2D image based an the 2D image information. As such, the display device can realize 2D display and has a 2D display mode.

The display device according to one embodiment of the present invention can switch among the holographic display mode, the naked-eye 3D display mode, and the 2D display mode so that the display device can have a plurality of display modes.

In another embodiment, as shown in FIGS. 2 and 3, the backlight module 01 includes a light-emitting unit 011 and a collimator lens 012. The light modulation module 02 is disposed on the light exit path S of the light-emitting unit 011 so that the collimation lens 012 is disposed between the light-emitting unit 011 and the light modulation module 02. That is, the collimating lens 012 and the light modulating module 02 are sequentially disposed on the light exit path S of the light-emitting unit 011 so that the light emitted by the light-emitting unit 011 can sequentially pass through the collimating lens 012 and the light modulating module 02. The control module 04 is then electrically connected to the light emitting unit 011. The control module 04 may be a controller, the light emitting unit 011 may be a laser light source, an LED array, or the like, and the present invention is not limited thereto.

In another embodiment, as shown in FIG. 2, the light emitting unit 011 includes a coherent light source 0111 and an incoherent light source 0112. The light modulation module 02 is disposed on the light exit path S of the coherent light source 0111 and that of the incoherent light source 0112. As such, a collimation lens 012 is disposed between the coherent and incoherent light sources 0111, 0112 and the light modulation module 02. That is, the collimator lens 012 and the light modulating module 02 are sequentially disposed on the light exit path of the coherent light source 0111. Since the light exit paths of the coherent light source 0111 and the incoherent light source 0112 are the same, the collimator lens 012 and the modulation module 02 are also located on the light exit path of the incoherent light source 0112. Then, the control module 04 is electrically connected to the coherent light source 0111 and the incoherent light source 0112, respectively.

In another embodiment as shown in FIG. 3, the light emitting unit 011 includes a coherent light source 0111 and a light converter 0113. The light modulation module 02 is disposed on the light exit path of the coherent light source 0111. The light converter 0113 and the collimator lens 012 are sequentially disposed on the light path of the coherent light source between the coherent light source 0111 and the light modulation module 02. That is, the light converter 0113, the collimating lens 012 and the light modulation module 02 are sequentially disposed on the light exit path of the coherent light source 0111. Then, the control module 04 is electrically connected to the coherent light source 0111 and the light converter 0113, respectively. The light converter 0113 may be a blind panel having a controllable opening that allows coherent light to be switched to incoherent light. The blind panel can scatter coherent light to form incoherent light, thereby converting the coherent light into incoherent light.

In another embodiment, as shown in FIG. 8, the light modulating module 02 may include a spatial light modulator, which has a flat plate-like structure. The liquid crystal lens 03 is formed on the light modulation module 02. Specifically, a first electrode 032 is formed on the first substrate 031. A second electrode 033 is formed on a surface of the spatial light modulator. The first substrate 031 is disposed opposite to the spatial light modulator such that the first electrode 032 is positioned between the first substrate 031 and the second electrode 033. A liquid crystal layer 034 is formed between the first electrode 032 and the second electrode 033.

The first substrate 031 may be a transparent substrate. Specifically, the first substrate 031 may be made of a non-metallic material which has strong light guide property such as glass, quartz, transparent resin, etc. The spatial light modulator has been described in detail in the prior art, and will not be described again in the embodiments of the present invention. The first electrode 032 and the second electrode 033 may be transparent electrodes, and may be made of indium tin oxide (ITO), indium zinc oxide (IZO) or other metal oxides, so that the first electrode 032 and the second electrode 033 may have good conductivity.

The first electrode 032 may be formed on the first substrate 031 by a one-time patterning process. The second electrode 033 may be formed on a plate surface of the spatial light modulator by a one-time patterning process. The embodiment of the present invention is not limited thereto. In one embodiment, as shown in FIG. 8, a passivation layer 036 is provided between the second electrode 033 and the plate surface of the spatial light modulator. During the formation of the second electrode 033, the passivation layer 036 may be formed on the plate surface of the spatial light modulator first, and then a second electrode 033 is formed on the passivation layer 036.

In another embodiment, as shown in FIG. 8, the light modulation module 02 includes a spatial light modulator. The spatial light modulator has a flat plate-like structure. A liquid crystal lens 03 is formed on the light modulation module 02. Specifically, a first electrode 032 is formed on the first substrate 031. A second electrode 033 is formed on the second substrate. The first substrate 031 and the second substrate are disposed facing each other so that the first electrode 032 and the second electrode 033 are positioned between the first substrate 031 and the second substrate. A liquid crystal layer 034 is formed between the first electrode 032 and the second electrode 033. A surface of the second substrate opposite to the second electrode 033 is adhesively attached to a surface of the spatial light modulator by an OCA. The first substrate 031 and the second substrate may each be a transparent substrate, and may be made of a non-metallic material which has strong light guide such as glass, quartz, transparent resin, or the like. The first electrode 032 and the second electrode 033 may be made of a metal oxide such as ITO or IZO.

In one embodiment, both the first electrode 032 and the second electrode 033 are strip electrodes. Alternatively, the first electrode 032 is a strip electrode and the second electrode 033 is a plate electrode. In FIGS. 1 to 4 and FIG. 8, the first electrode 032 and the second electrode 033 are both strip electrodes.

In one embodiment, as shown in FIG. 8, a frame sealant 035 is disposed between the second substrate and the first substrate 031. Alternatively, the frame sealant 035 is disposed between the passivation layer 036 and the first substrate 031 or between the plate surface of the spatial light modulator and the first substrate 031. The liquid crystal layer 034 is located in a space enclosed by the frame sealant 035.

Specifically, in the manufacturing process, first, frame sealant 035 may be provided around the edges of one of the second substrate, the passivation layer 036 or the plate surface of the spatial light modulator, and pre-cured. Then, liquid crystals are filled in a space enclosed by the frame sealant 035 to obtain a liquid crystal layer 034. Finally, the one of the second substrate, the passivation layer 036 or the plate surface of the spatial light modulator is assembled with the first substrate 031, and the frame sealant 035 is cured with UV light.

In one embodiment, an alignment film is disposed on a surface of the first electrode 032 facing the liquid crystal layer 034 and a surface of the second electrode 033 facing the liquid crystal layer 034 respectively to facilitate alignment of liquid crystal molecules in the liquid crystal layer 034.

In one embodiment, a first polarizer is disposed on a side of the light modulation module 02 facing the backlight module 01. A second polarizer is disposed on a side of the light modulation module 02 opposite to the backlight module 01. The long axis direction of the liquid crystal molecules in the first state in the liquid crystal lens 03 is parallel to the polarization direction of the second polarizer. The liquid crystal molecules in the first state have no adjustment effect on the light incident on the liquid crystal lens.

As described above, in the method of manufacturing the display device according to one embodiment of the present invention, the control module can control the light emitted by the backlight module to switch between coherent light and incoherent light, and provide any one of at least two types of image information to the light modulation module, and control the light modulating module to display an image based on the provided image information. Therefore, the display device according to one embodiment of the present invention can display at least two types of images, and meet people's different needs for viewing. Furthermore, the at least two types of image information may include at least two of the following image information: holographic image information, naked-eye 3D image information, and 2D image information. The display modes of the display device may include at least two of the following modes: a holographic display mode, a naked-eye 3D display mode, and a 2D display mode. Therefore, the present invention may provide a display device capable of realizing a holographic display mode, a naked-eye 3D display mode, and a 2D display mode, and switching among the three display modes. The display device can overcome the shortcomings of the present single display mode such as a small viewing angle, very few sources, and limited range of movement during viewing, and allow users to select among the holographic display mode, the naked-eye 3D display mode, and the 2D display mode.

Figure 10:
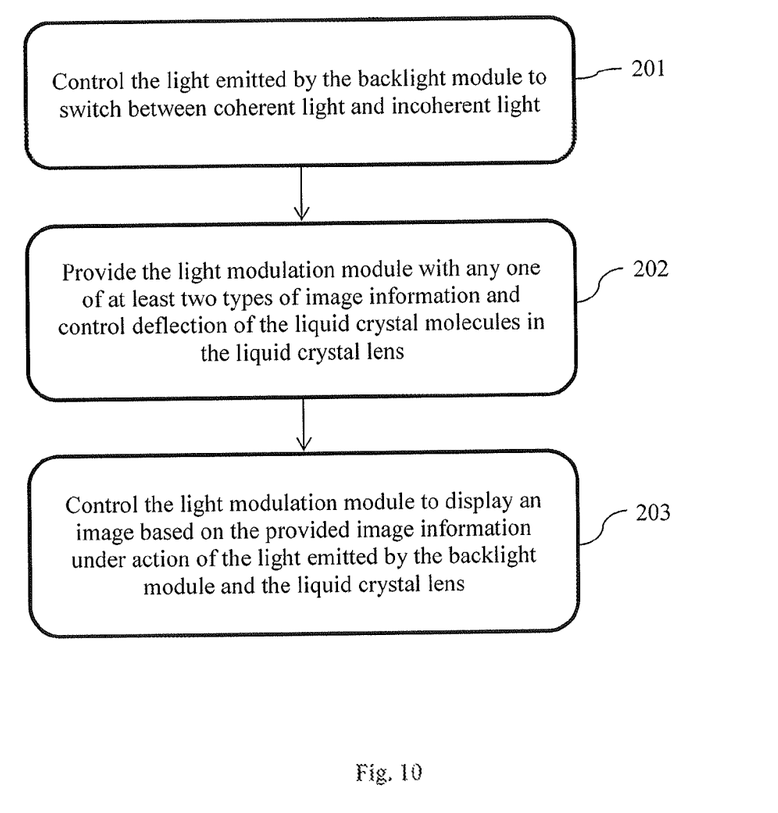
FIG. 10 is a flowchart of a method of displaying a display device according to one embodiment of the present invention.

FIG. 10 shows a flow chart of a display method of a display device according to one embodiment of the present invention. The display method may be applied to the display device shown in any one of FIGS. 1 to 4. According to FIG. 10, the display method of the display device may include the following steps.

In step 201, the light emitted by the backlight module is controlled to switch between coherent light and incoherent light.

In step 202, the light modulation module is provided with any one of at least two types of image information and deflection of the liquid crystal molecules in the liquid crystal lens is controlled.

In step 203, the light modulation module is controlled to display an image based on the provided image information under action of the light emitted by the backlight module and the liquid crystal lens.

As described above, in a display method of the display device according to one embodiment of the present invention, since the control module can control the light emitted by the backlight module to switch between coherent light and incoherent light and provide any one of the at least two types of image information to the light modulation module, and control the light modulation module to display an image based on the provided image information. Therefore, the display device according to the embodiment of the present invention can display at least two types of images. This can overcome shortcomings of a display device having only a single function, which cannot meet people's different needs for viewing.

In the display method of the display device according to one embodiment of the present invention, as shown in FIGS. 1 to 4, the control module 04 may be a controller. The control module 04 may control the light emitted by the backlight module to switch between coherent light and incoherent light. In one embodiment, the control module 04 may switch the light once every a predetermined time interval or switch the light in response to a user's triggering. The embodiment of the present invention is not limited thereto.

The control module 04 may store any one of at least two types of image information. The at least two types of image information include at least two of the following image information: holographic image information, naked-eye 3D image information, and 2D image information. The control module 04 may provide any one of at least two types of image information to the light modulation module 02 and control deflection of liquid crystal molecules in the liquid crystal lens 03. The control module 04 may also control the light modulation module 02 to display an image based on the provided image information under action of the light emitted by the backlight module 01 and the liquid crystal lens 03.

In Step 201, in a holographic display mode, the backlight module is controlled to emit coherent light. When the display mode of the display device is switched from the holographic display mode to a naked-eye 3D display mode or a 2D display mode, the backlight module is controlled to emit incoherent light.

Specifically, the holographic display requires coherent light while the naked-eye 3D display or 2D display requires incoherent light. Thus, in the holographic display mode, the control module 04 may control the backlight module 01 to emit coherent light. When the display mode of the display device is switched from the holographic display mode to the naked-eye 3D display mode or the 2D display mode, the control module 04 may control the backlight module 01 to emit incoherent light.

The backlight module 01 may be any one as shown in FIGS. 2 to 4. When the backlight module 01 is the backlight module shown in FIG. 2, in the holographic display mode, the control module 04 may control the coherent light source 0111 to emit light. When the display mode of the display device is switched from the holographic display mode to the naked-eye 3D display mode or the 2D display mode, the control module 04 may control the incoherent light source 0112 to emit light.

When the backlight module 01 is the backlight module shown in FIG. 3, in the holographic display mode, the control module 04 may control the coherent light source 0111 to emit light and control the light converter 0113 not to convert light. When the display mode of the display device is switched from the holographic display mode to the naked-eye 3D display mode or the 2D display mode, the control module 04 may control the coherent light source 0111 to emit light, and control the light converter 0113 to convert coherent light into incoherent light by controlling the controllable opening of the light converter 0113.

In step 202, in the holographic display mode, holographic image information is provided to the light modulation module, and the liquid crystal molecules in the liquid crystal lens are controlled to deflect to a first state. The liquid crystal molecules in the first state have no adjustment effect on the light incident on the liquid crystal lens. In the naked-eye 3D display mode, naked-eye 3D image information is provided to the light modulation module. The liquid crystal molecules in the liquid crystal lens are controlled to deflect to form a liquid crystal lenticular lens. In one embodiment, the control module 04 can apply an electrical voltage to the first electrode 032 and the second electrode 033 of the liquid crystal lens to form the liquid crystal lenticular lens. In the 2D display mode, 2D image information is provided to the light modulation module and the liquid crystal molecules in the liquid crystal lens are controlled to deflect to the first state.

Specifically, in the holographic display mode, the control module 04 may provide the holographic image information to the light modulation module 02, and control the liquid crystal molecules in the liquid crystal lens 03 to deflect to the first state. In the naked-eye 3D display mode, the control module 04 may provide the naked eye 3D image information to the light modulation module 02, and control the liquid crystal molecules in the liquid crystal lens 03 to deflect to form a liquid crystal lenticular lens. In one embodiment, the control module 04 may apply an electrical voltage to the first electrode 032 and the second electrode 033 of the liquid crystal lens 03 respectively to form a liquid crystal lenticular lens. In the 2D display mode, the control module 04 may provide 2D image information to the light modulation module 02 and control the liquid crystal molecules in the liquid crystal lens 03 to deflect to the first state.

In step 203, in the holographic display mode, the light modulation module is controlled to display a holographic image based on the holographic image information under the action of the light emitted by the backlight module and the liquid crystal lens. In the naked-eye 3D display mode, the light modulation module is controlled to display the naked-eye 3D image based on the naked-eye 3D image information under the action of the light emitted by the backlight module and the liquid crystal lens. In the 2D display mode, the light modulation module is controlled to display a 2D image based on the 2D image information under the action of the light emitted by the backlight module and the liquid crystal lens.

Specifically, in the holographic display mode, the control module 04 may control the light modulation module 02 to display the holographic image based on the holographic image information under the action of the light emitted from the backlight module 01 and the liquid crystal lens 03. In this case, the light emitted by the backlight module 01 is a coherent light, and the liquid crystal molecules in the liquid crystal lens 03 are in the first state. In the naked-eye 3D display mode, the control module 04 may control the light modulation module 02 to display the naked-eye 3D image based on the naked eye 3D image information under the action of the light emitted by the backlight module 01 and the liquid crystal lens 03. In this case, the light emitted by the backlight module 01 is incoherent light, and the liquid crystal molecules in the liquid crystal lens 03 form a liquid crystal lenticular lens. In the 2D display mode, the control module 04 may control the light modulation module 02 to display a 2D image based on the 2D image information under the action of the light emitted by the backlight module 01 and the liquid crystal lens. In this case, the light emitted by the backlight module 01 is incoherent light, and the liquid crystal molecules in the liquid crystal lens 03 are in the first state.

As described above, in the display method of the display device according to one embodiment of the present invention, the control module can control the light emitted by the backlight module to switch between coherent light and incoherent light, and provide any one of at least two types of image information to the light modulation module so that the light modulation module displays an image based on the provided image information. Therefore, the display device can display at least two types of images, and overcome shortcomings of a display device having only a single function, which cannot meet people's different needs for viewing.

Furthermore, the at least two types of image information include at least two of the following image information: holographic image information, naked-eye 3D image information, and 2D image information. The display modes of the display device include at least two of the following display modes: a holographic display mode, a naked-eye 3D display mode, and a 2D display mode. Therefore the embodiment of the present invention provides a display device capable of realizing a holographic display mode, a naked-eye 3D display mode, and a 2D display mode, and switching among the three display modes. This overcomes shortcoming of the present single display device such as a small viewing angle, very few sources, and a limited range of movement during viewing, and allows users to select among the holographic display mode, the naked-eye 3D display mode and the 2D display mode.

One of ordinary skill in the art can complete all or a portion of the steps of the above embodiments through hardware or through programs giving instructions to related hardware. The programs may be stored in a computer-readable storage medium. The storage medium mentioned may be a read-only memory, a magnetic disk, an optical disk, or the like.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A display device, comprising:
 a backlight module configured to emit coherent light and incoherent light selectively;
 a spatial light modulator configured to display one of at least two types of image information;
 a liquid crystal lens; and
 a control module,
  wherein the spatial light modulator and the liquid crystal lens are sequentially disposed on a light exit path of the backlight module,
  wherein the liquid crystal lens comprises a first substrate, a first electrode formed on the first substrate, and a second electrode formed on a surface of the spatial light modulator facing the first substrate,
  wherein the first substrate is disposed opposite to the spatial light modulator, and liquid crystal molecules are formed between the first electrode and the second electrode, wherein the control module is configured to control light emitted by the backlight module to switch between the coherent light and the incoherent light, provide any one of at least two types of image information to the spatial light modulator and control deflection of liquid crystal molecules in the liquid crystal lens, and control the spatial light modulator to display an image based on the provided image information, wherein the backlight module comprises a light emitting unit and a collimator lens, wherein the collimating lens and the spatial light modulator are sequentially disposed on a light exit path of the light emitting unit, and the light emitting unit and the control module are electrically connected, and wherein the light emitting unit comprises a coherent light source and an incoherent light source, and the control module is configured to control the coherent light source and the incoherent light source to alternately emit light, thereby switching the light emitted by the backlight module between the coherent light and the incoherent light.

2. The display device according to claim 1, wherein the at least two types of image information are selected from the group consisting of holographic image information, naked-eye three-dimensional image information, and two-dimensional image information.

3. The display device according to claim 1, wherein the light emitting unit comprises a laser light source or a light-emitting diode light source.

4. The display device according to claim 1, wherein the spatial light modulator is a liquid crystal display spatial light modulator having a flat plate structure.

5. The display device according to claim 1, wherein the liquid crystal lens further comprises a passivation layer formed between the surface of the spatial light modulator and the second electrode.

6. The display device according to claim 1, wherein the liquid crystal lens comprises a first substrate, a first electrode formed on the first substrate, a second substrate formed on a surface of the spatial light modulator facing the first substrate, a second electrode formed on the second substrate, and liquid crystal molecules between the first electrode and the second electrode.

7. The display device according to claim 1, wherein both the first electrode and the second electrode are strip electrodes, or the first electrode is a strip electrode and the second electrode is a plate electrode.

8. The display device according to claim 1, further comprising a first polarizer on a side of the spatial light modulator facing the backlight module and a second polarizer on a side of the spatial light modulator opposite to the backlight module, wherein a polarization direction of the second polarizer is parallel to a long axis direction of the liquid crystal molecules in a first state, and the liquid crystal molecules in the first state do not adjust the light emitted by the backlight module.

9. A display method of a display device according to claim 1, the method comprising:

controlling light emitted by the backlight module to switch between the coherent light and the incoherent light, providing any one of at least two kinds of image information to the spatial light modulator and controlling deflection of liquid crystal molecules in the liquid crystal lens, and controlling the spatial light modulator to display an image based on the provided image information.

10. The display method according to claim 1, wherein controlling the light emitted by the backlight module to switch between the coherent light and the incoherent light comprises:

controlling the backlight module to emit the coherent light in a holographic display mode, and controlling the backlight module to emit the incoherent light when the holographic display mode of the display device is switched to a naked-eye three-dimensional display mode or a two-dimensional display mode.

11. The display method according to claim 9, wherein providing any one of at least two types of image information to the spatial light modulator and controlling the deflection of liquid crystal molecules in the liquid crystal lens comprises:

providing holographic image information to the spatial light modulator and controlling the liquid crystal molecules in the liquid crystal lens to deflect to a first state in a holographic display mode, providing naked-eye three-dimensional image information to the spatial light modulator and controlling the liquid crystal molecules in the liquid crystal lens to deflect to form a liquid crystal lenticular lens in a naked-eye three-dimensional display mode, and providing two-dimensional image information to the spatial light modulator and controlling the liquid crystal molecules in the liquid crystal lens to deflect to the first state in a two-dimensional display mode, wherein the liquid crystal molecules in the first state do not adjust the light emitted by the backlight module.

12. The display method according to claim 9, wherein controlling the spatial light modulator to display an image based on the provided image information comprises:

controlling the spatial light modulator to display a holographic image based on the holographic image information in a holographic display mode, controlling the spatial light modulator to display a naked-eye three-dimensional image based on the naked-eye three-dimensional image information in a naked-eye three-dimensional display mode, and controlling the spatial light modulator to display a two-dimensional image based on the two-dimensional image information in a two-dimensional display mode.

13. The display method according to claim 11, wherein controlling the liquid crystal molecules in the liquid crystal lens to deflect to the first state comprises:

applying a voltage to a first electrode and a second electrode of the liquid crystal lens respectively with a voltage difference between the first electrode and the second electrode being a first voltage difference, and the liquid crystal molecules in the liquid crystal lens are deflected to the first state by the first voltage difference.

14. The display method according to claim 11, where controlling the liquid crystal molecules in the liquid crystal lens to deflect to form a liquid crystal lenticular lens comprises:

applying a voltage to a first electrode and a second electrode of the liquid crystal lens respectively with a voltage difference between the first electrode and the second electrode being a second voltage difference, and the liquid crystal molecules in the liquid crystal lens are deflected by the second voltage difference to form the liquid crystal lenticular lens.

* * * * *